(12) United States Patent
Takahashi

(10) Patent No.: US 8,274,708 B2
(45) Date of Patent: Sep. 25, 2012

(54) IMAGE PROCESSING APPARATUS AND METHOD FOR PREVENTING REMOVAL OF AN ENCODED IMAGE

(75) Inventor: Katsuyuki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 12/258,257

(22) Filed: Oct. 24, 2008

(65) Prior Publication Data

US 2009/0109493 A1 Apr. 30, 2009

(30) Foreign Application Priority Data

Oct. 29, 2007 (JP) ................ 2007-280438

(51) Int. Cl.
H04N 1/40 (2006.01)
(52) U.S. Cl. .......... 358/3.28; 358/1.9; 358/540
(58) Field of Classification Search .......... None
See application file for complete search history.

(56) References Cited

U.S. PATENT DOCUMENTS

| | | | | |
|---|---|---|---|---|
| 5,539,523 | A * | 7/1996 | Nakai et al. | 358/296 |
| 5,706,368 | A * | 1/1998 | Mita | 382/284 |
| 5,937,232 | A * | 8/1999 | Taguchi et al. | 399/81 |
| 7,002,709 | B1 * | 2/2006 | Terada et al. | 358/3.28 |
| 7,057,765 | B1 * | 6/2006 | Fischer et al. | 358/1.9 |
| 7,319,542 | B2 * | 1/2008 | Sievert et al. | 358/1.9 |
| 7,502,506 | B2 * | 3/2009 | Matsuda et al. | 382/167 |
| 7,646,393 | B2 * | 1/2010 | Choe et al. | 345/604 |
| 7,738,143 | B2 * | 6/2010 | Ishimoto et al. | 358/3.28 |
| 7,742,197 | B2 * | 6/2010 | Takiyama et al. | 358/3.28 |
| 7,760,395 | B2 * | 7/2010 | Torikoshi | 358/1.9 |
| 2003/0130990 | A1 * | 7/2003 | Brown et al. | 707/3 |
| 2003/0179399 | A1 * | 9/2003 | Matsunoshita | 358/1.13 |
| 2004/0179713 | A1 * | 9/2004 | Tani et al. | 382/100 |
| 2004/0184065 | A1 * | 9/2004 | Guan et al. | 358/1.14 |
| 2005/0123194 | A1 * | 6/2005 | Fan et al. | 382/167 |
| 2006/0256409 | A1 * | 11/2006 | Hiramatsu | 358/538 |
| 2007/0127056 | A1 * | 6/2007 | Hirano et al. | 358/1.14 |
| 2007/0297013 | A1 * | 12/2007 | Nakagawa | 358/3.28 |
| 2008/0019746 | A1 * | 1/2008 | Takiyama et al. | 399/366 |

FOREIGN PATENT DOCUMENTS

| | | |
|---|---|---|
| JP | 2001-197297 A | 7/2001 |
| JP | 2002-305646 A | 10/2002 |
| JP | 2004-223854 A | 8/2004 |
| JP | 2004-228896 A | 8/2004 |
| JP | 2005-175773 A | 6/2005 |

OTHER PUBLICATIONS

Japanese Office Action for Application No. 2007-280438 dated Dec. 20, 2011.

* cited by examiner

*Primary Examiner* — Dung Tran

(74) *Attorney, Agent, or Firm* — Carter, DeLuca, Farrell & Schmidt LLP

(57) ABSTRACT

An image processing apparatus includes a color removing unit, a determining unit, and a preventing unit. The color removing unit is configured to remove a specified color from an input image. The determining unit is configured to determine whether information is embedded in the input image. The preventing unit is configured to prevent an image in an area where the information is embedded in the input image from being removed by the color removing unit when the determining unit determines that the information is embedded in the input image.

2 Claims, 14 Drawing Sheets

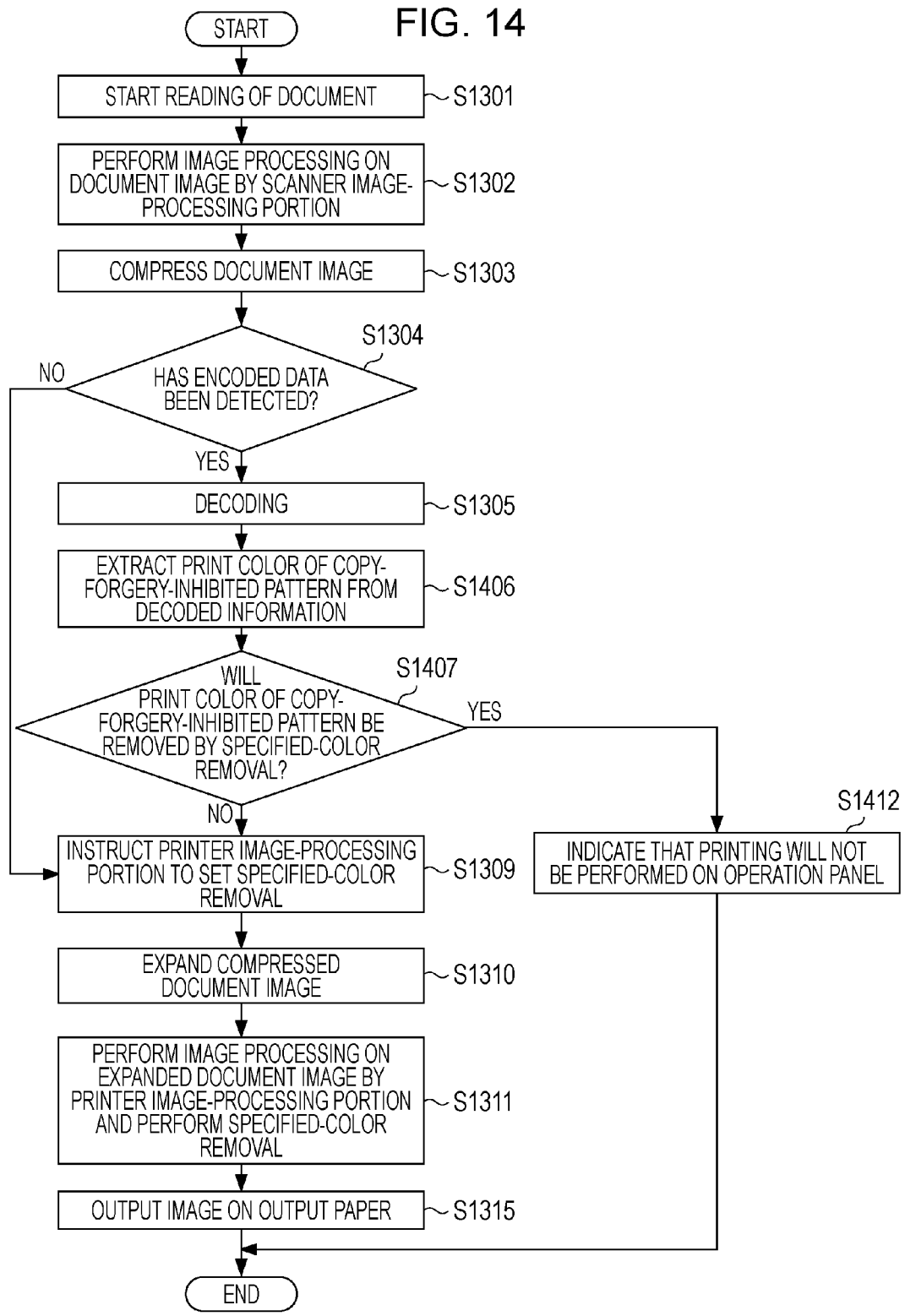

IMAGE PROCESSING APPARATUS AND METHOD FOR PREVENTING REMOVAL OF AN ENCODED IMAGE

BACKGROUND OF THE INVENTION

1. Field of the Invention

The present invention relates to an image processing apparatus capable of handling an image in which information is embedded, to a method for controlling an image processing apparatus, and to a computer-readable medium.

2. Description of the Related Art

There is a known technique for printing a copy-forgery-inhibited pattern image, as described in, for example, Japanese Patent Laid-Open No. 2001-197297.

A copy-forgery-inhibited pattern image is an image in which a pattern of, for example, a character string is made visible when a printed material with the image printed thereon is copied. The copy-forgery-inhibited pattern image is composed of a set of large dots (latent image) and a set of small dots (background image). Because the small dots are too small to be accurately reproduced by a copier, only an area where the large dots (latent image) are present is reproduced on a duplicate. As a result, a pattern, for example, a character string, is made visible. In this case, the set of large dots forms the pattern of, for example, a character string. The copy-forgery-inhibited pattern image is useful for preventing leakage of secret information through a printed material by representation of tracking information as the pattern of, for example, a character string. To prevent leakage of secret information in such a way, the tracking information typically contains information about a user who requested printing (e.g., user name) and a printing time.

A technique for printing an encoded image is also well known. The encoded image used here indicates a two-dimensional or linear bar code image and a digital watermark image formed by a digital watermarking technique. The technique for printing an encoded image is effective at preventing leakage of confidential documents by including important information, such as tracking information, into the encoded image.

In addition, a technique for printing each component of a two-dimensional code image as large dots in a copy-forgery-inhibited pattern image is also well known, as described in, for example, Japanese Patent Laid-Open No. 2002-305646. In this patent document, dots representing the shape of / or \ are printed as large dots. By the definition of that the mark / indicates 0 and the mark \ indicates 1, information (e.g., tracking information) is printed as the large dots of a copy-forgery-inhibited pattern image.

As described above, techniques for embedding information, such as the technique for printing a copy-forgery-inhibited pattern image, the technique for printing an encoded image, or the technique for printing an encoded image in a large-dot area of a copy-forgery-inhibited pattern image, are being actively developed in recent years. The techniques are of great utility in preventing leakage of secret information by, for example, embedding tracking information.

Copiers typically have the function of removing a specified color, as described in, for example, Japanese Patent Laid-Open No. 2004-228896. This function is that a user specifies a color that the user wants to remove in copying a document and a document image obtained by scanning of the document is printed such that the specified color is removed from the document image. One example characteristic is that removing red from a document in which a user added the red with a red pen allows a duplicate of the document prior to the addition.

However, when the technique disclosed in this patent document is applied to an image in which information is embedded, an area where the information is embedded will be deleted. As a result, for example, tracking information will be invisible, and this will encourage leakage of secret information.

SUMMARY OF THE INVENTION

According to an aspect of the present invention, an image processing apparatus includes a color removing unit, a determining unit, and a preventing unit. The color removing unit is configured to remove a specified color from an input image. The determining unit is configured to determine whether information is embedded in the input image. The preventing unit is configured to prevent an image in an area where the information is embedded in the input image from being removed by the color removing unit when the determining unit determines that the information is embedded in the input image.

Further features of the present invention will become apparent from the following description of exemplary embodiments (with reference to the attached drawings).

BRIEF DESCRIPTION OF THE DRAWINGS

FIG. 14 is a flowchart illustrating another control process in copying when specified-color removal is set.

DESCRIPTION OF THE EMBODIMENTS

Exemplary embodiments for carrying out the invention will be described below with reference to the accompanying drawings.

Figure 1:
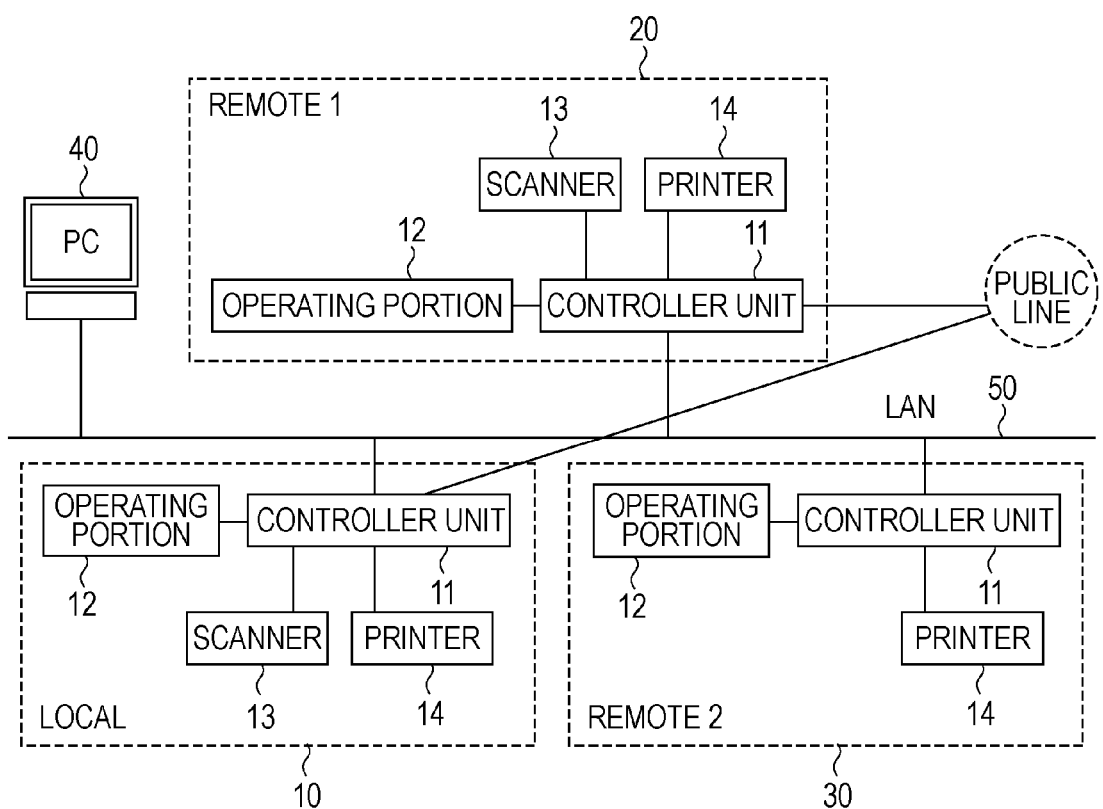
FIG. 1 illustrates a general configuration of an image forming system.

Printing System (FIG. 1)

A first embodiment of the present invention is described in detail with reference to the drawings. FIG. 1 is a block diagram that illustrates an example configuration of a printing system according to an embodiment of the present invention. In the printing system according to the present embodiment, a host computer 40 and three image forming apparatuses 10, 20, and 30 are connected to a local area network (LAN) 50. However, the printing system according to the present invention is not limited to the number of connections above. In the present embodiment, a LAN is used in a connection method. However, the present invention is not limited to this connection method. For example, any network, such as a wide area network (WAN) (e.g., a public line), a serial transmission method, such as universal serial bus (USB), and a parallel transmission method, such as Centronics and small computer systems interface (SCSI), are also applicable in the present invention.

The host computer (hereinafter referred to as the PC) 40 has the functions of a personal computer. The PC 40 can transmit and receive a file via file transfer protocol (FTP) or sever message block (SMB) protocol over the LAN 50 or a WAN. The PC 40 can provide the image forming apparatuses 10, 20, and 30 with an instruction to print thorough a printer driver.

The image forming apparatuses 10 and 20 have the same configuration. The image forming apparatus 30 is an image forming apparatus that has only the printing function, so it does not have a scanner portion, which is included in the image forming apparatuses 10 and 20. In the following description, for the sake of clarity, attention is focused on the image forming apparatus 10 of the image forming apparatuses 10 and 20, and a configuration thereof will be described in detail.

The image forming apparatus 10 includes a scanner portion 13 serving as an image input device, a printer portion 14 serving as an image output device, and a controller 11 responsible for controlling an overall operation of the image forming apparatus 10. The image forming apparatus 10 further includes an operating portion 12 serving as a user interface (UI).

Figure 2:
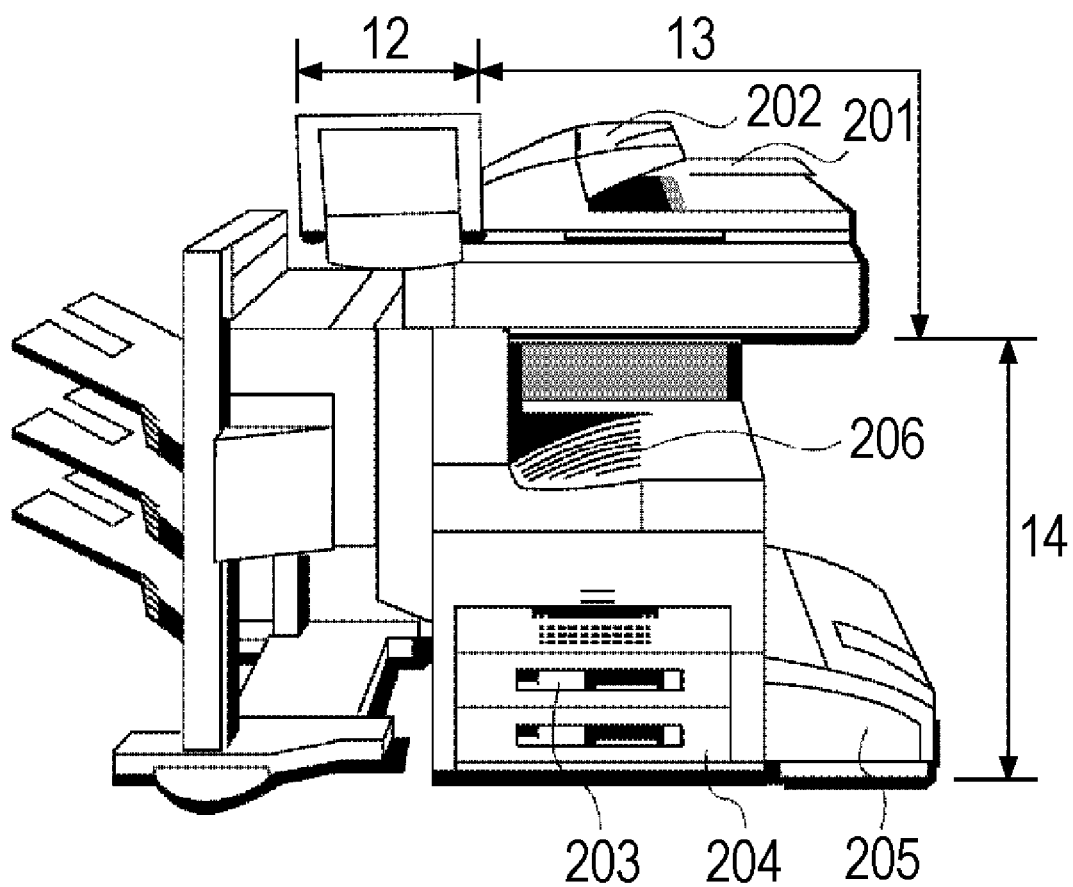
FIG. 2 is an external view of an input and output device of an image forming apparatus.

Image Forming Apparatus 10 (FIG. 2)

An external view of the image forming apparatus 10 is illustrated in FIG. 2. The scanner portion 13 converts information on an image into an electric signal by inputting reflected light obtained by scanning and exposing an image formed on a document into charge-coupled devices (CCDs). The scanner portion 13 further converts an electric signal into a luminance signal composed of red (R), green (G), and blue (B) and outputs the luminance signal to the controller 11 as image data.

Documents are placed on a tray 202 of a document feeder 201. When a user instructs the apparatus to start reading from the operating portion 12, the controller 11 provides the scanner portion 13 with an instruction to read a document. In response to the instruction, the scanner portion 13 feeds documents one by one from the tray 202 of the document feeder 201 and reads the document. Instead of the automatically feeding performed by the document feeder 201, scanning a document placed on a glass surface (not shown) using a moving exposure portion may be used as the document reading method.

The printer portion 14 is an image forming device that can form image data received from the controller 11 on a sheet of paper. The image forming method used in the present embodiment is an electrophotographic method using a photosensitive drum and a photosensitive belt. However, the present invention is not limited to this method. For example, an inkjet method of discharging ink through a minute nozzle array onto a sheet of paper to print data is also applicable in the present invention. The printer portion 14 includes a plurality of paper cassettes 203, 204, and 205 for allowing a user to select a sheet from different sizes or different orientations. A sheet with data printed thereon is ejected onto an output tray 206.

Figure 3:
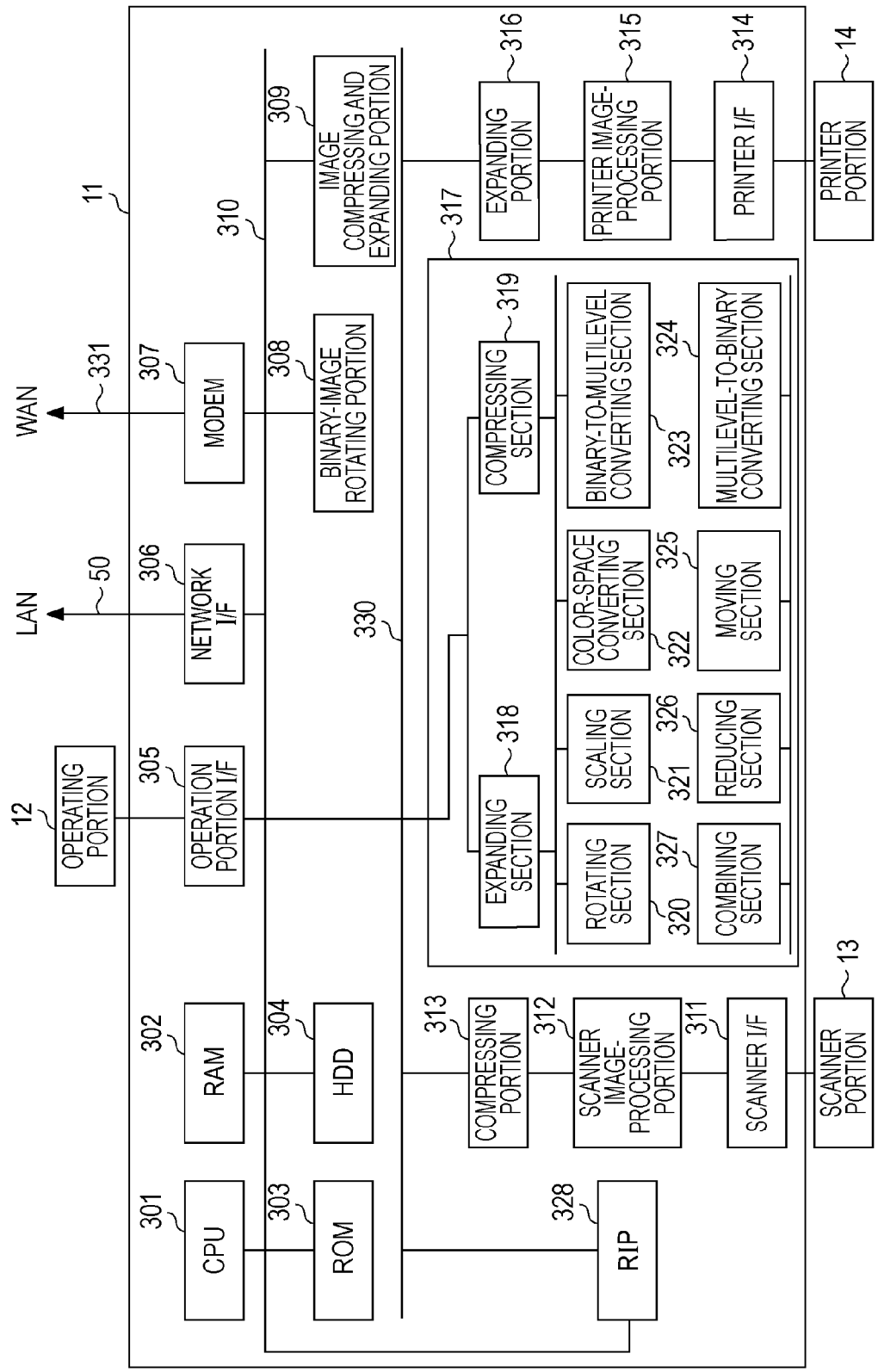
FIG. 3 illustrates a general configuration of the image forming apparatus.

Detailed Description of Controller 11 (FIG. 3)

FIG. 3 is a block diagram illustrating a configuration of the controller 11 of the image forming apparatus 10 in further detail.

In the example shown in FIG. 3, the controller 11 is electrically connected to the scanner portion 13 and the printer portion 14 and also connected to the PC 40 and an external device through the LAN 50 and a WAN 331. This allows exchanges of image data and device information therebetween.

A central processing unit (CPU) 301 provides general control for access to various devices being connected to the image forming apparatus 10 on the basis of a control program stored in a read-only memory (ROM) 303 and also provides general control for various kinds of processing performed within the controller 11. A random-access memory (RAM) 302 is a work memory for operation of the CPU 301 and also a memory for temporarily storing image data. The RAM 302 includes a static RAM (SRAM), which retains stored contents even after a power supply is turned off, and a dynamic RAM (DRAM), which deletes stored contents after the power supply is turned off. The ROM 303 stores a boot program of the apparatus. A hard disk drive (HDD) 304 can store system software and image data.

An operation portion I/F 305 is an interface for connecting a system bus 310 and the operating portion 12. The operation portion I/F 305 receives image data to be displayed on the operating portion 12 from the system bus 310 and outputs the image data to the operating portion 12 and also outputs, to the system bus 310, information input from the operating portion 12.

A network I/F 306 is connected to the LAN 50 and the system bus 310 and inputs and outputs information. A modem 307 is connected to the WAN 331 and the system bus 310 and inputs and outputs information. A binary-image rotating portion 308 converts the orientation of image data prior to transmission. An image compressing and expanding portion 309 converts the resolution of image data prior to transmission into a predetermined resolution or a resolution matching with the capabilities of a recipient. In compression and expansion, joint bi-level image experts group (JBIG), modified modified read (MMR), modified read (MR), and modified Huffman (MH) can be used. An image bus 330 is a transmission line used for exchanges of image data and includes a peripheral component interconnect (PCI) bus or IEEE1394.

A scanner image-processing portion 312 corrects, processes and edits image data received from the scanner portion 13 through a scanner I/F 311. The scanner image-processing portion 312 determines whether received image data corresponds to a color document or monochrome document or whether the received image data corresponds to a text document or photograph document. The scanner image-processing portion 312 associates the result of the determination result with the image data. The associated information is referred to as attribute data. The details of a process performed by the scanner image-processing portion 312 will be described later.

Figure 4:
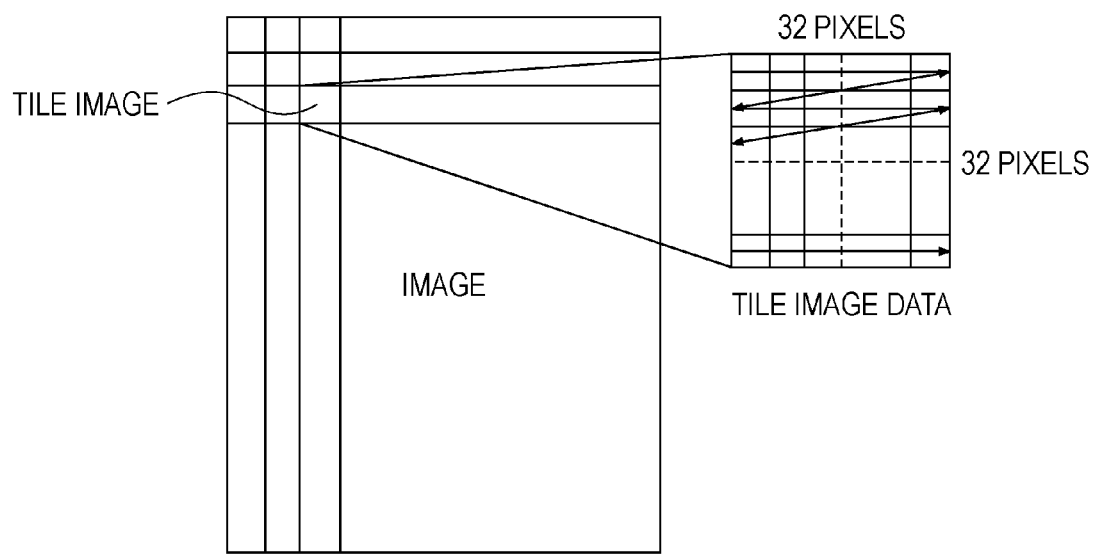
FIG. 4 conceptually illustrates tile data.

A compressing portion 313 receives image data and divides the image data into blocks of 32 pixels×32 pixels. This image data of 32 pixels×32 pixels is referred to as tile data. FIG. 4 conceptually illustrates this tile data. In a document (a paper medium prior to reading), an area corresponding to this tile data is referred to as a tile image. Average luminance information in the blocks of 32 pixels×32 pixels and the coordinates of the tile image on the document are added to the tile data as header information. The compressing portion 313 compresses image data composed of a plurality of tile data sets. Compressed image data is expanded by an expanding portion 316. After expanding the image data composed of a plurality of tile data sets, the expanding portion 316 rasterizes the image data and outputs it to the printer image-processing portion 315.

The printer image-processing portion 315 receives image data transmitted from the expanding portion 316 and performs image processing on the image data while referring to attribute data associated with this image data. The image data after the image processing is output to the printer portion 14 through a printer I/F 314. The details of a process performed by the printer image-processing portion 315 will be described later.

An image converting portion 317 performs predetermined conversion on image data. The image converting portion 317 includes processing sections described below.

An expanding section 318 expands received image data. A compressing section 319 compresses received image data. A rotating section 320 rotates received image data. A scaling section 321 converts the resolution of received image data (e.g., from 600 dpi to 200 dpi). A binary-to-multilevel converting section 323 converts color space of received image data. The color-space converting section 322 can perform publicly known background removal using a matrix or table, publicly known LOG conversion (from RGB to CMY), and publicly known output-color correction (from CMY to CMYK). The binary-to-multilevel converting section 323 converts 2-level image data into 256-level image data. In contrast, a multilevel-to-binary converting section 324 converts received 256-level image data into 2-level image data using, for example, an error diffusion technique.

A combining section 327 combines two received image data sets into a single image data set. In combining two image data sets, a method of setting an average value of luminance values of pixels to be combined at a combined luminance value or a method of setting a luminance value of a brighter pixel in luminance level at a luminance value of a combined pixel can be used. Alternatively, a method of setting a luminance value of a darker pixel at a luminance value of a combined pixel can also be used. Moreover, a method of determining a luminance value of a combined pixel using OR operation, AND operation, or exclusive OR operation is also applicable. All these combining methods are well-known techniques. A reducing section 326 converts the resolution of received image data by reducing one or more pixels of the image data and generates ½, ¼, or ⅛ of the image data. A moving section 325 adds a margin to received image data or deletes a margin therefrom.

A Raster Image Processor (RIP) 328 receives intermediate data generated on the basis of PDL code data transmitted from, for example, the PC 40 and generates bitmap data (multilevel).

Figure 5:
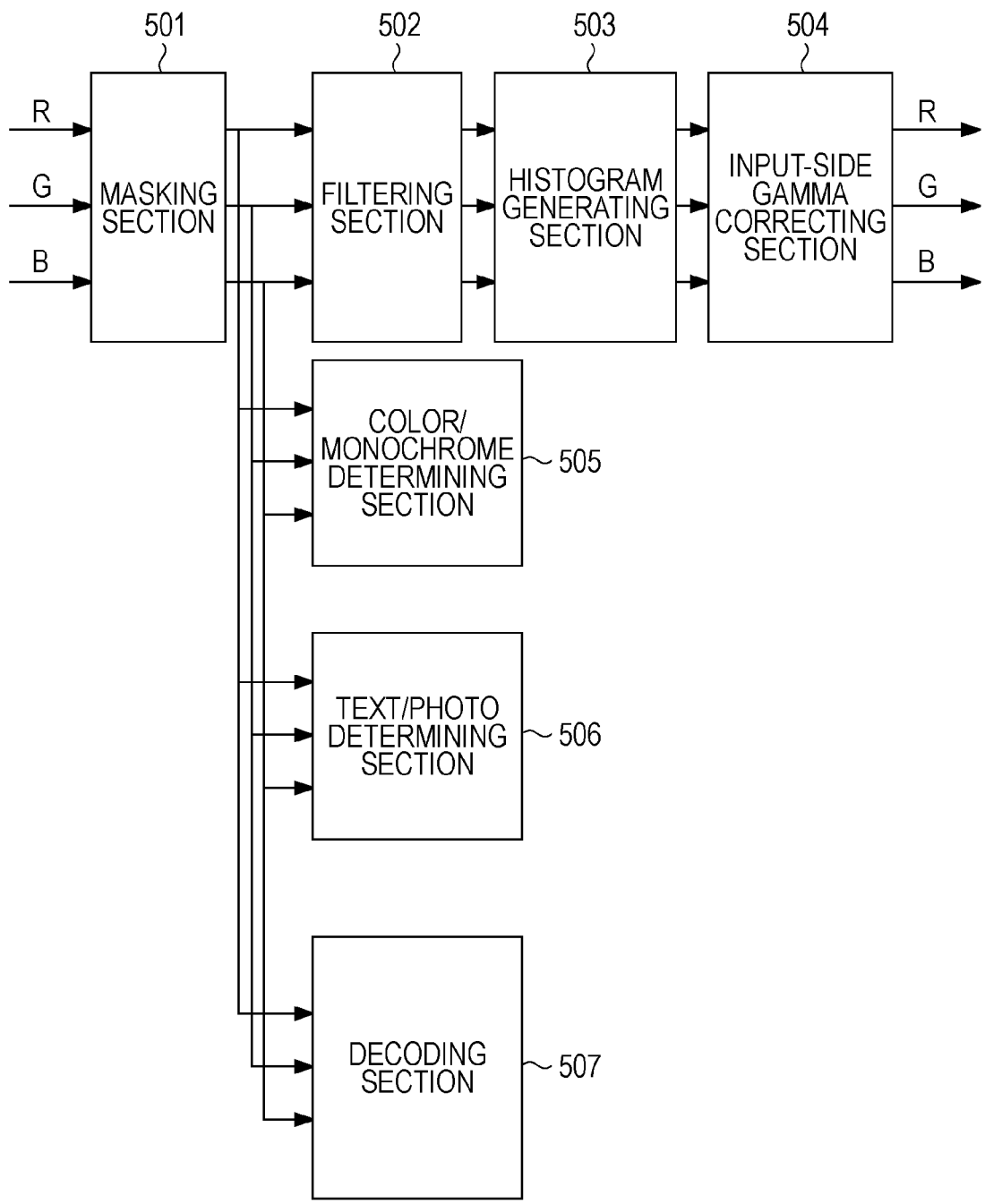
FIG. 5 is a block diagram of a scanner image processing portion.

Detailed Description of Scanner Image-Processing Portion 312 (FIG. 5)

FIG. 5 illustrates an internal configuration of the scanner image-processing portion 312.

The scanner image-processing portion 312 receives image data composed of an 8-bit luminance signal corresponding to each of R, G, and B. The luminance signal is converted into a standard luminance signal independent of a filter color of a CCD by a masking section 501. The standard luminance signal is output from the masking section 501 to a filtering section 502, a color/monochrome determining section 505, a text photo determining section 506 and a decoding section 507.

The filtering section 502 optionally corrects a spatial frequency of received image data. The filtering section 502 performs an operation on the received image data using, for example, a 7×7 matrix. In copiers and multifunction peripherals, the text mode, the photography mode, or the text/photography mode is selectable as the copy mode by pressing of a button 704 illustrated in FIG. 7. When the text mode is selected by a user, the filtering section 502 filters the overall image data with a filter for text. When the photography mode is selected, the filtering section 502 filters the overall image data with a filter for photographs. When the text/photography mode is selected, the filter is suitably switched for each pixel in accordance with a text/photograph determining signal (a part of attribute data), which will be described later. That is, the use of the filter for text or the filer for photographs is determined for each pixel. In the filter for photographs, a coefficient for enabling only a high-frequency component to be smoothed is set. This aims to make image roughness unnoticeable. In the filter for text, a coefficient for enabling relatively strong edge enhancement is set. This aims to enhance sharpness of text.

A histogram generating section 503 samples luminance data of each of pixels forming received image data. More specifically, the histogram generating section 503 samples luminance data in a rectangular area surrounded by specified starting points and ending points in a main scanning direction and a sub scanning direction, at a constant pitch in the main scanning direction and the sub scanning direction. Then, the histogram generating section 503 generates histogram data based on the result of the sampling. The generated histogram data is used to estimate the background level in the process of background removal. An input-side gamma correcting section 504 converts the data into luminance data having nonlinear characteristics using, for example, a table.

The color/monochrome determining section 505 determines whether each of the pixels forming received image data is chromatic color or achromatic color and associates the result of the determination as a color/monochrome determining signal (a part of attribute data) with the image data.

The text/photo determining section 506 determines whether each of the pixels forming received image data is a pixel forming a dot, a pixel forming a character in dots, or a pixel forming a solid image, on the basis of the pixel value of each pixel and the pixel values of its adjacent pixels. A pixel that matches with neither of them is a pixel forming a white area. The text/photo determining section 506 associates the result of the determination as a text/photo determining signal (a part of attribute data) with the image data.

The decoding section 507 detects the presence of encoded data existing within image data output from the masking section 501. When detecting the presence, the decoding section 507 decodes the detected encoded data and extracts information.

Figure 6:
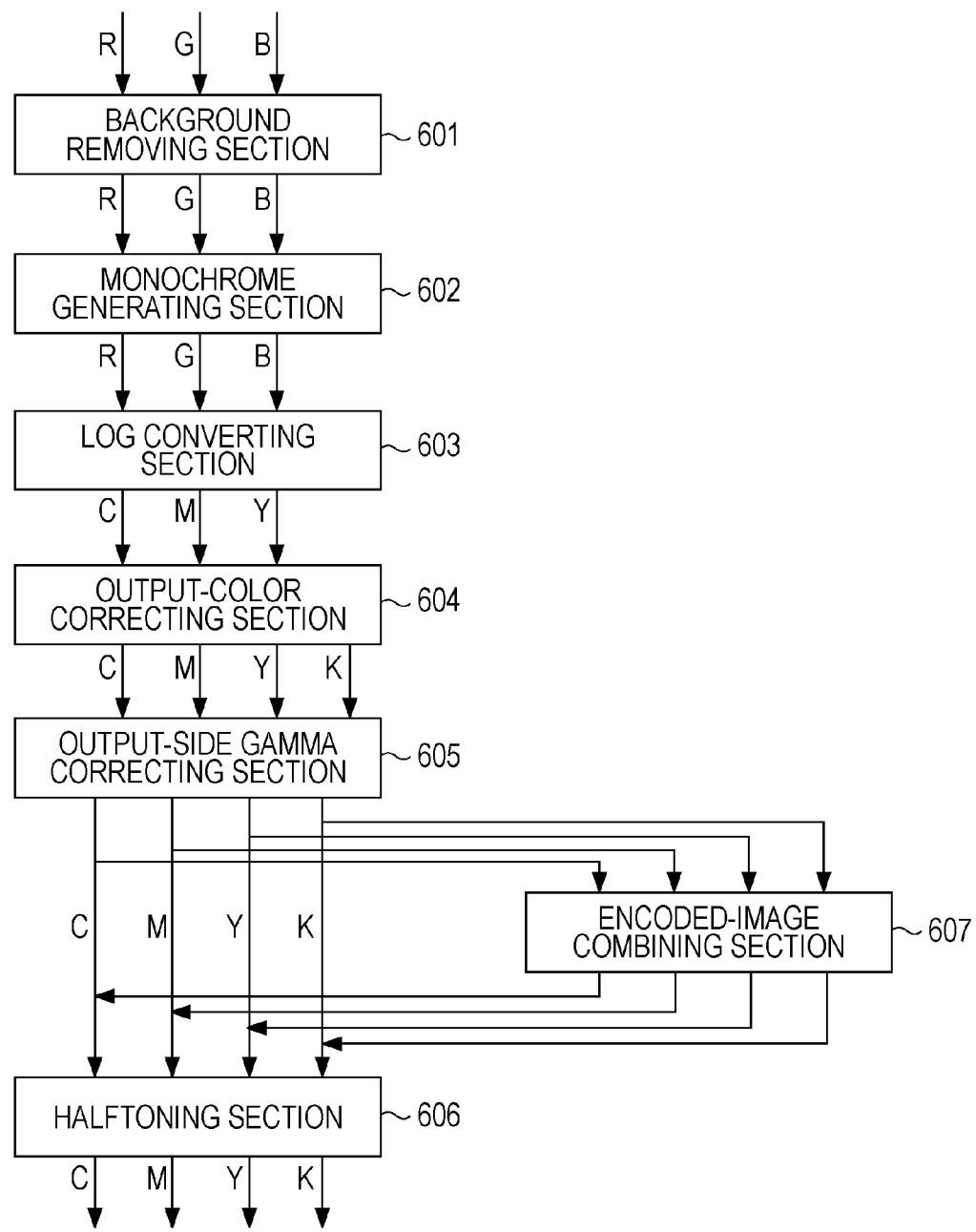
FIG. 6 is a block diagram of a printer image processing portion.

Detailed Description of Printer Image-Processing Portion 315 (FIG. 6)

FIG. 6 illustrates a flow of a process performed by the printer image-processing portion 315.

A background removing section 601 removes the color of the background of image data using histogram data generated by the scanner image-processing portion 312. A monochrome generating section 602 converts color data into monochrome data. A log converting section 603 performs luminance-to-density conversion. For example, the log converting section 603 converts input image data in the form of RGB into image data in the form of CMY. An output-color correcting section 604 performs output-color correction. For example, the output-color correcting section 604 converts input image data in the form of CMY into image data in the form of CMYK using a table or a matrix. An output-side gamma correcting section 605 performs correction such that a signal value input into the output-side gamma correcting section 605 is proportional to a reflection density value after a duplicate is output. An encoded-image combining section 607 combines (document) image data and encoded image data generated by encoding which will be described later or a copy-forgery-inhibited pattern image generated by copy-forgery-inhibited pattern generation which will be described later. A halftoning section 606 performs halftoning in accordance with the number of gray levels of the printer portion, which will output the data. For example, the halftoning section 606 performs 2-level gradation or 32-level gradation on received image data having a high gray level.

In the scanner image-processing portion 312 and the printer image-processing portion 315, received image data can be output without being processed by the processing sections included therein. Hereinafter, passing data through a processing section without processing the data, as described above, is represented as "passing data through a processing section."

Encoding

The CPU 301 can provide control for encoding predetermined information (containing, for example, device number, printing time information, and user ID information) to generate encoded image data.

In the specification herein, an encoded image indicates a two-dimensional or linear bar code image and a digital watermark image formed by a digital watermarking technique.

The CPU 301 can provide control for transmitting generated encoded image data to the encoded-image combining section 607 in the printer image-processing portion 315 using a data bus (not shown).

The above-described control (control for generating an encoded image and control for transmission) is performed by execution of a program stored in the RAM 302. The description of the controller 11 is now complete.

Description of Operating Screen

Figure 7:
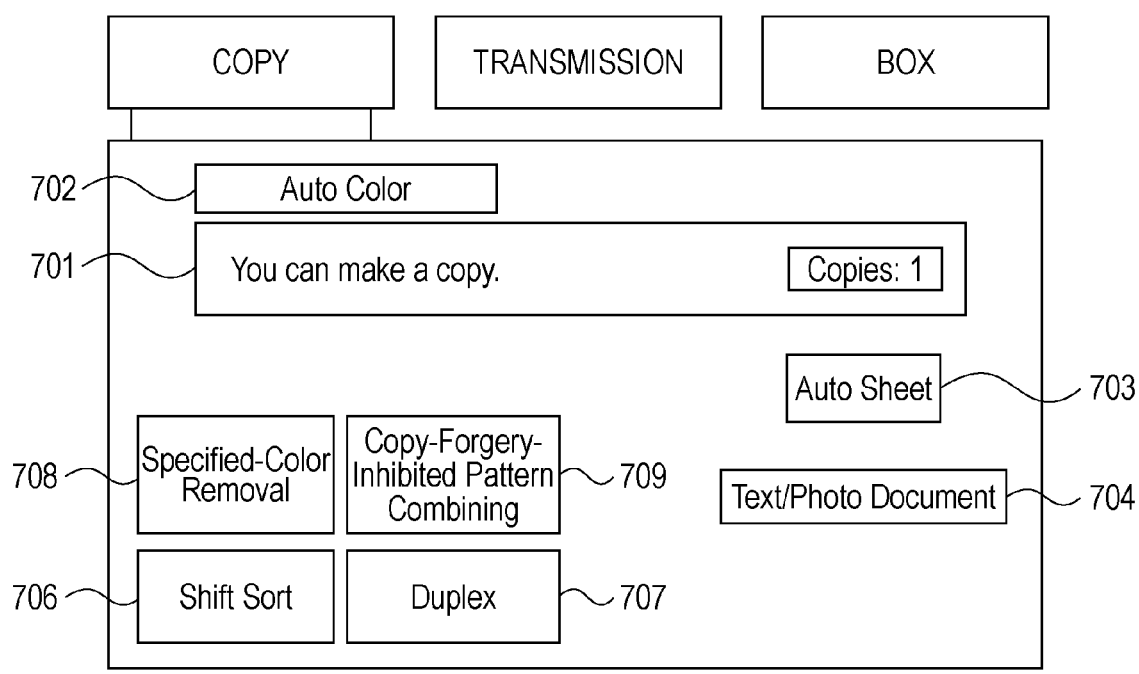
FIG. 7 illustrates a copy screen of an operating portion.

FIG. 7 illustrates an initial screen appearing in the image forming apparatus 10. A region 701 indicates whether the image forming apparatus 10 is in a state where it can make a copy and also indicates a set number of copies to be made. The document selection button 704 allows a user to select the type of a document. Upon the pressing of this button, a pop-up menu appears for selecting the mode from among three types: the text mode, the photography mode, and the text/photography mode. A finishing button 706 allows a user to make various settings of finishing. A duplex setting button 707 allows a user to make the settings for duplex reading and duplex printing. A reading mode button 702 allows a user to select the mode of reading a document. Upon the pressing of this button, a pop-up menu for selecting the mode from among three types: color, black, and automatic (ACS) modes. When the color mode is selected, color copy is performed; when the black mode is selected, monochrome copy is performed. When the ACS mode is selected, the copy mode is determined from the color/monochrome determining signal, which is described above. A paper selection button 703 allows a user to select a paper feed stage in which paper to be output is accommodated.

Figure 10:
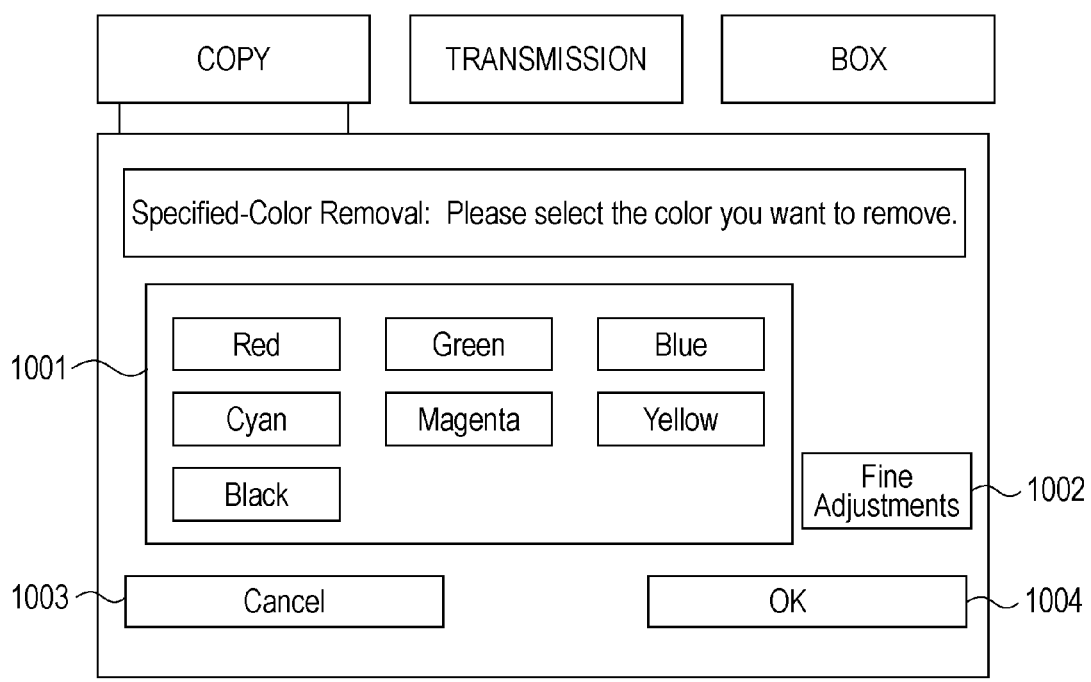
FIG. 10 illustrates a screen of the operating portion for allowing a user to set specified-color removal.

A region 708 is the button for allowing a user to select specified-color removal. When the user presses the region 708, a setting screen for specified-color removal illustrated in FIG. 10 is displayed on the operating screen. In FIG. 10, buttons for allowing a user to specify the color to be removed are displayed in a region 1001. When the user selects any of the colors, the selected color is specified and removed. A region 1002 allows a user to specify fine adjustments. When the user presses the region 1002, a screen that the user can input a numerical value for defining fine adjustments of the specified color is displayed. A region 1003 is a cancel key. When a user presses the region 1003, the specified-color removal capability is disabled. A region 1004 is an OK key. When a user presses the region 1004, the specified-color removal capability is enabled, and the color specified on the screen illustrated in FIG. 10 is removed in copying.

Figure 9:
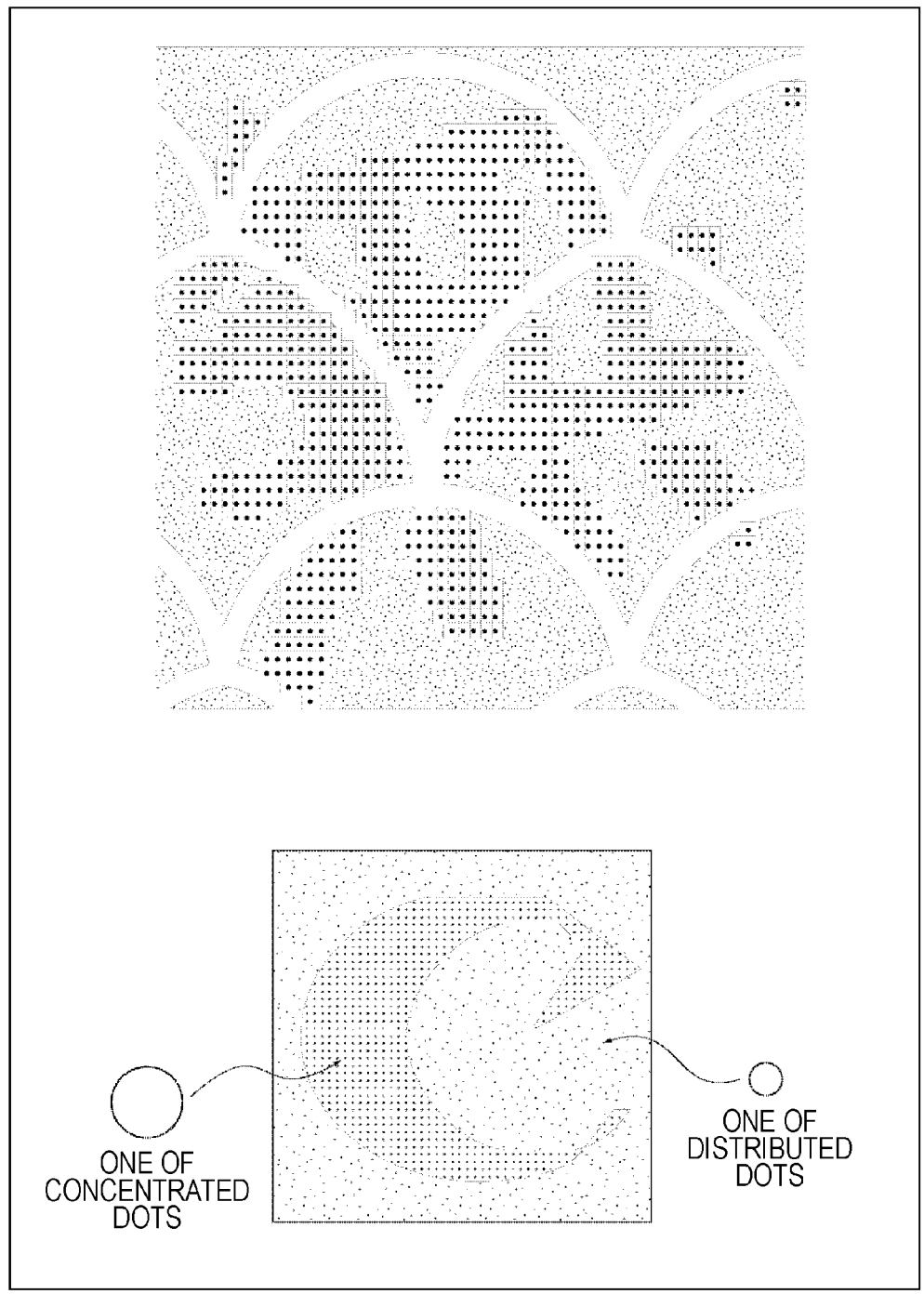
FIG. 9 illustrates an example of a generated copy-forgery-inhibited pattern image.
Figure 11:
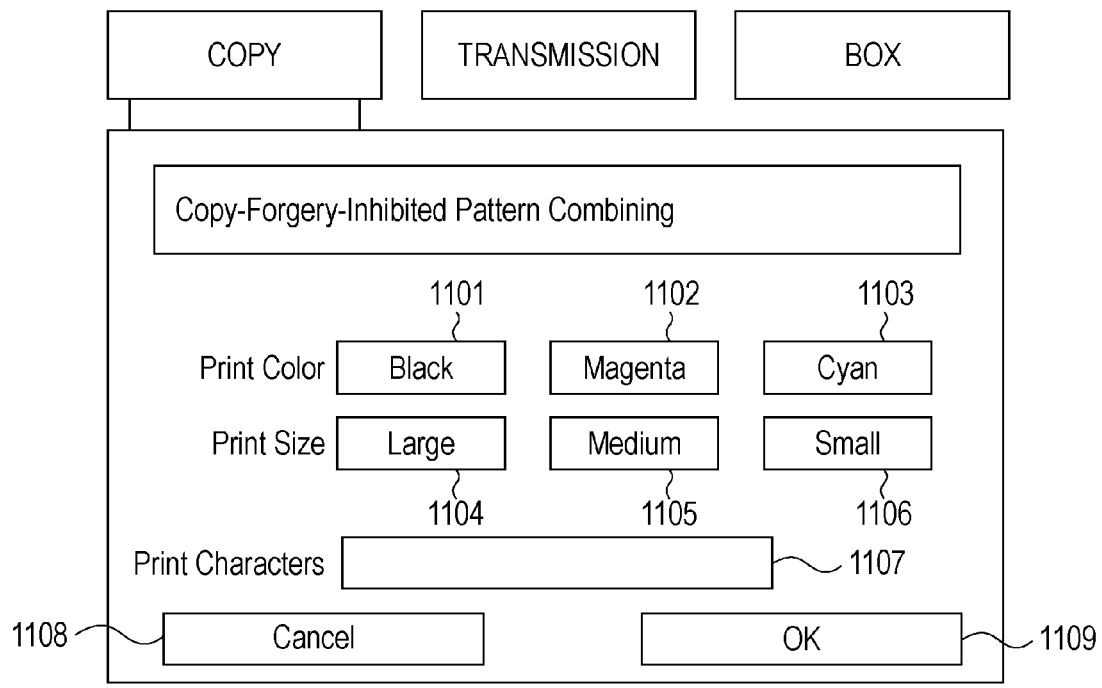
FIG. 11 illustrates a screen of the operating portion for allowing a user to set copy-forgery-inhibited pattern combining.

In FIG. 7, a region 709 is a button for allowing a user to select copy-forgery-inhibited pattern image combining. When the user presses the region 709, a setting screen for copy-forgery-inhibited pattern image combining illustrated in FIG. 11 is displayed on the operating screen. In FIG. 11, regions 1101, 1102, and 1103 are the regions for allowing a user to specify a print color of a copy-forgery-inhibited pattern image to be added. When the user presses any of the regions 1101, 1102, and 1103, the copy-forgery-inhibited pattern image is printed with black if the region 1101 is pressed, with magenta if the region 1102 is pressed, or with cyan if the region 1103 is pressed. In FIG. 11, regions 1104, 1105, and 1106 are the regions for allowing a user to specify a print size of a character to be embedded as a latent image in the copy-forgery-inhibited pattern image. In FIG. 11, a region 1107 is the region for allowing a user to specify a character string to be embedded as a latent image in the copy-forgery-inhibited pattern image. In FIG. 11, a region 1108 is a cancel key. When a user presses the region 1108, printing of a combined copy-forgery-inhibited pattern image is disabled. In FIG. 11, a region 1109 is an OK key. When a user presses the region 1109, the copy-forgery-inhibited pattern image combining is enabled, and the copy-forgery-inhibited pattern is combined using the settings specified on the copy-forgery-inhibited pattern setting screen illustrated in FIG. 11 in printing, and the image is printed. FIG. 9 illustrates an example of a generated copy-forgery-inhibited pattern image.

Normal Copying

A control process performed by the CPU 301 in copying when neither copy-forgery-inhibited pattern image combining nor specified-color removal is set is described with reference to the flowchart illustrated in FIG. 8.

In step S801, the CPU 301 provides control for transmitting image data obtained by reading of a document performed by the scanner portion 13 to the scanner image-processing portion 312 through the scanner I/F 311.

In step S802, the scanner image-processing portion 312 performs processing illustrated in FIG. 5 on the image data and generates new image data and attribute data. The attribute data is associated with the image data. When the processing of step S802 has been completed, the processing of step S803 and that of step S804 start substantially concurrently.

In step S802, the compressing portion 313 divides the new image data generated by the scanner image-processing portion 312 into blocks of 32 pixels×32 pixels to generate tile data sets. In addition, the compressing portion 313 compresses image data composed of the plurality of tile data sets.

In step S803, the CPU 301 provides control for transmitting the image data compressed by the compressing portion 313 to the RAM 302 and causing the RAM 302 to store it. The image data is transmitted to the image converting portion 317 as needed. In this case, the transmitted image data is subjected to image processing, and the image data is transmitted to the RAM 302 again and stored therein.

In step S804, the CPU 301 provides control for transmitting the image data stored in the RAM 302 to the expanding portion 316. Also in this step, the expanding portion 316 expands the image data. In addition, the expanding portion 316 rasterizes the expanded image data composed of a plurality of tile data sets. The rasterized image data is transmitted to the printer image-processing portion 315.

In step S805, the printer image-processing portion 315 edits the image data according to the attribute data associated with the image data. This processing is illustrated in FIG. 6. The halftoning section 606 performs halftoning on the edited image in accordance with the number of gray levels of the printer portion, which will output the data, and transmits the processed data to the printer portion 14 through the printer I/F 314.

In step S806, the printer portion 14 forms an image based on the combined image data on a sheet of output paper.

Copying When Copy-Forgery-Inhibited Pattern Image Combining Is Set

Figure 12:
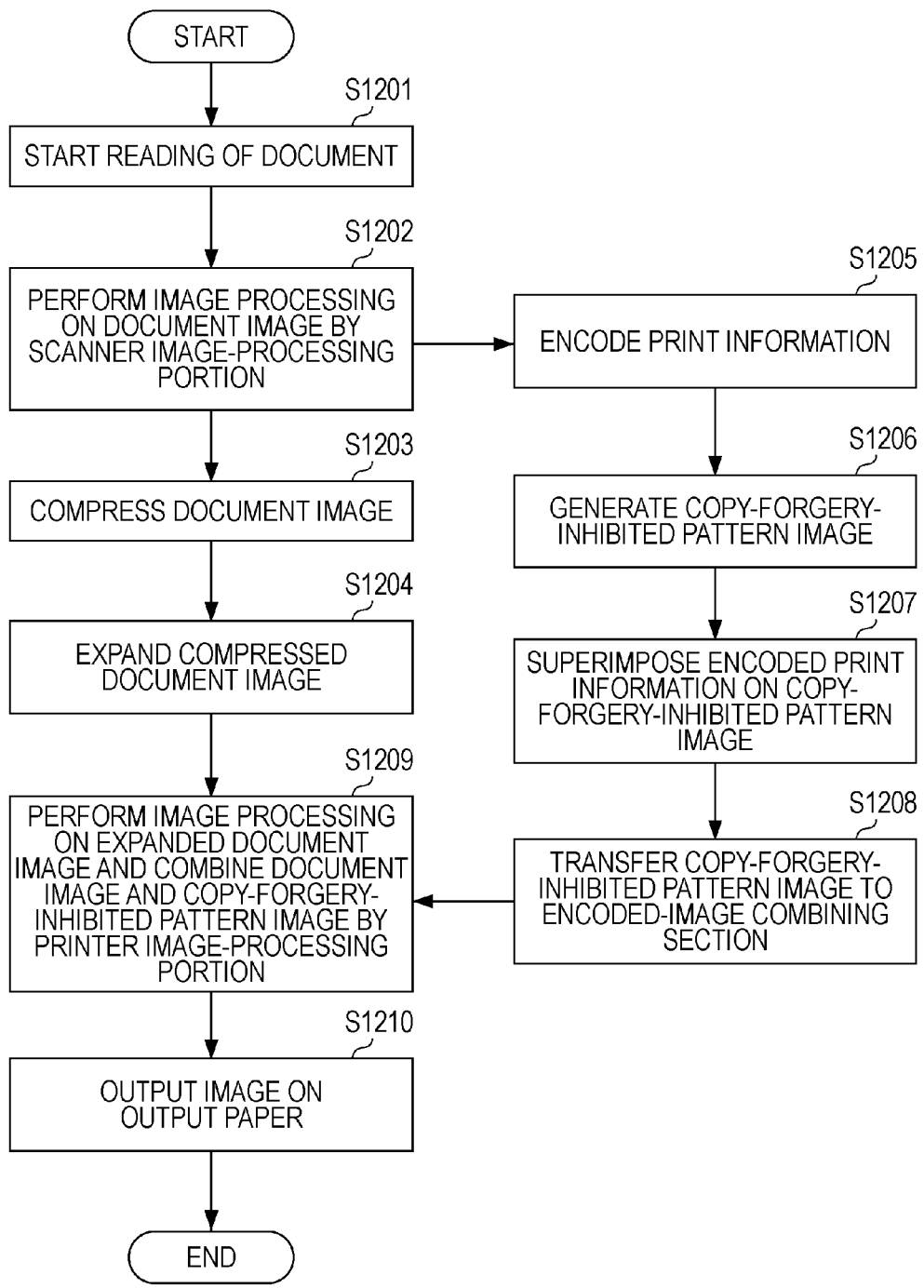
FIG. 12 is a flowchart illustrating a control process in copying when copy-forgery-inhibited pattern combining is set.

A control process performed by the CPU 301 in combining a copy-forgery-inhibited pattern image and making a copy is described next with reference to the flowchart illustrated in FIG. 12.

Figure 8:
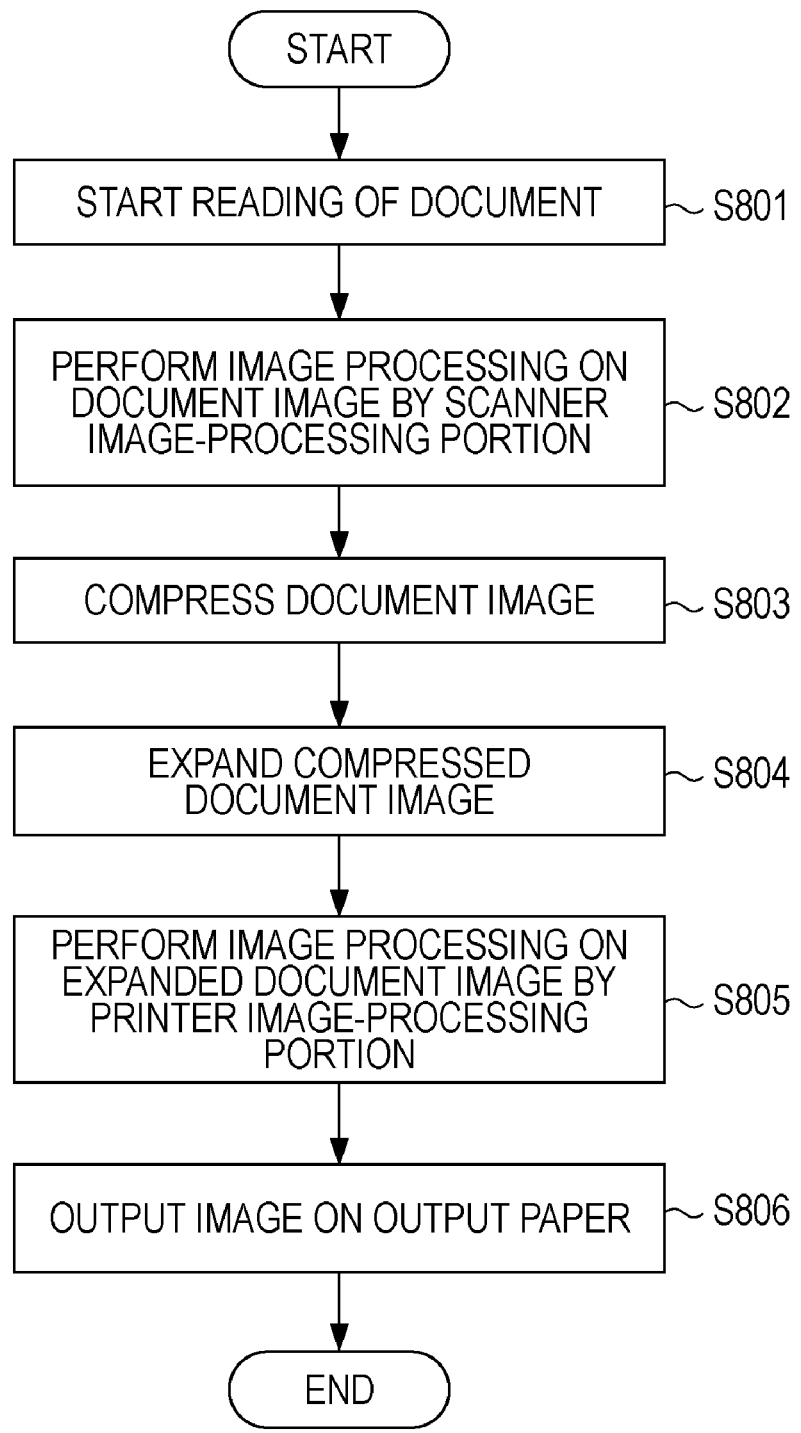
FIG. 8 is a flowchart illustrating a control process in normal copying.

In steps S1201, S1202, S1203, and S1204, reading of an image of a document, image processing, compression, and expansion are performed, as in steps S801, S802, S803, and S804 illustrated in FIG. 8. Here, the CPU 301 performs copy-forgery-inhibited pattern image generation from step S1205 to step S1208 in parallel with step S1202 to step S1204. In step S1205, information on copying is encoded. Here, the information on copying contains, for example, device number, printing time information, and user ID information. In addition, one distinct characteristic of the present invention is that the print color of the copy-forgery-inhibited pattern is contained as the information on copying and is also encoded. Then, in step S1206, the CPU 301 generates a copy-forgery-inhibited pattern image on the basis of the settings specified on the copy-forgery-inhibited pattern setting screen illustrated in FIG. 11. Then, in step S1207, the CPU 301 superimposes the encoded data generated in step S1205 on a large-dot area corresponding to the copy-forgery-inhibited pattern generated in step S1206 to generate a copy-forgery-inhibited pattern image containing the encoded data. Then, in step S1208, the copy-forgery-inhibited pattern image generated in step S1207 is transferred to the encoded-image combining section 607. Then, in step S1209, the printer image-processing portion 315 combines the document image data and the copy-forgery-inhibited pattern image transmitted to the encoded-image combining section 607, in addition to editing the image data described in step S805. The combined image data obtained by the combining is subjected to halftoning performed by the halftoning section 606 in accordance with the number of gray levels of the printer portion, which will output the data. In step S1210, the printer portion 14 forms an image based on the combined image data on a sheet of output paper.

It is noted that examples of the method of superimposing a copy-forgery-inhibited pattern image on a large-dot area include a publicly known technique, for example, the technique described in Japanese Patent Laid-Open No. 2002-305646, which is mentioned in Description of the Related Art above, or other publicly known techniques, such as a technique described in Japanese Patent Laid-Open No. 2004-223854.

Japanese Patent Laid-Open No. 2004-223854 discloses a method of embedding information by slightly displacing a large dot from a lattice point. More specifically, information is embedded under a rule of, for example, when the large dot is displaced upward and leftward from the lattice point, it indicates information 1; when the large dot is displaced upward and rightward from the lattice point, it indicates information 0.

Copying When Specified-Color Removal Is Set

A control process performed by the CPU 301 in removing a specified color and making a copy is described next with reference to the flowchart illustrated in FIG. 13.

In steps S1301, S1302, and S1303, reading of an image of a document, image processing, and compression are performed, as in steps S801, S802, and S803 illustrated in FIG. 8. In the present embodiment, the image of the document obtained by the reading is referred to as an input image. In step S1302, after the processing, the CPU 301 controls the decoding section 507 to detect whether encoded data is present in the document image. When the encoded data is detected, the CPU 301 obtains decoded data obtained by decoding performed by the decoding section 507, and flow proceeds to step S1304. In step S1304, it is determined whether the encoded data has been detected. When the encoded data has not been detected (NO in step S1304), flow proceeds to step S1309, where the CPU 301 instructs the printer image-processing portion 315 to set specified-color removal. Here, the specified-color removal is performed in a look-up table (LUT) for use in converting an input CMY signal into an output CMYK signal in the output-color correcting section 604. More specifically, the CPU 301 sets the LUT such that, when a CMY signal having a hue specified on the specified-color removal setting screen illustrated in FIG. 10 is input, 0 is output as an output signal. This removes the specified color from the input image signal. In step S1310, the compressed document image is expanded. In step S1311, the printer image-processing portion 315 performs image processing in accordance with the settings set by the CPU 301 and also removes the specified color. In step S1315, the printer portion 14 forms an image based on the image data on a sheet of output paper.

When it is determined that the encoded data has been detected (YES in step S1304), flow proceeds to step S1305, where the CPU 301 obtains decoded data from the decoding section 507. In step S1306, the color of the encoded image is extracted from decoded information. In the present embodiment, on the assumption that the color of the encoded image is contained in the decoded information, the color of the encoded image is extracted utilizing the decoded information. However, those skilled in the art could easily arrive at another method. For example, the color of the encoded image can also be extracted by determining of which area the encoded image detected in step S1304 occupies and identifying of the color of the area. In step S1307, the hue of the color of the encoded image contained in the decoded data (encoded-image color) is compared with the hue of the color to be removed in specified-color removal. When they match with each other or when they are close to each other more than a predetermined threshold, it is determined that the encoded-image color will be removed. Otherwise, it is determined that the encoded-image color will not be removed. When it is determined that the encoded-image color will not be removed (NO in step S1307), flow proceeds to step S1309, where printing with specified-color removal is performed, as previously described. When it is determined that the encoded-image color will be removed (YES in step S1307), flow proceeds to step S1312. In steps S1312 to S1314, one example of a process for preventing the encoded-image color from being removed in specified-color removal is disclosed. This processing can prevent an image in an area where the encoded image is present (i.e., encoded image) from being removed.

First, in step S1312, a message indicating that specified-color removal will not be performed (to prevent removal of the encoded image) is displayed on the operating portion 12. In step S1313, the compressed document image is expanded. In step S1314, printing image processing is performed with the same settings as in step S805 illustrated in FIG. 8 (the settings in which the specified-color removal is disabled). In step S1315, the printer portion 14 forms an image based on the image data on a sheet of output paper. As a result, output in which the encoded image is not removed is obtainable.

In the present embodiment, the document image obtained by reading performed by the scanner is considered as an input image. However, the input image is not necessarily limited to such a document image. For example, a received image that has been transmitted from another apparatus is also referred to as the input image. To prevent encoded image contained in the received image from being removed, the processing of steps S1307 to S1314 described in the present embodiment is also applicable.

As described above, there is a printed material in which encoded data forms a part of a copy-forgery-inhibited pattern image. In such a case, the printed material in which encoded data forms a part of a copy-forgery-inhibited pattern image is input as an input image through the scanner. When the processing of steps disclosed in the present embodiment is performed on the input image, the color of the copy-forgery-inhibited pattern image is prevented from being removed (i.e., removal of a copy-forgery-inhibited pattern image is prevented).

In the first embodiment, when specified-color removal that will cause an encoded image to disappear is set, an output image can be obtained by not performing the specified-color removal. However, to make conditions stricter in terms of security, it is possible to block obtainment of an output image itself when specified-color removal that will cause a copy-forgery-inhibited pattern to disappear is set.

Figure 13:
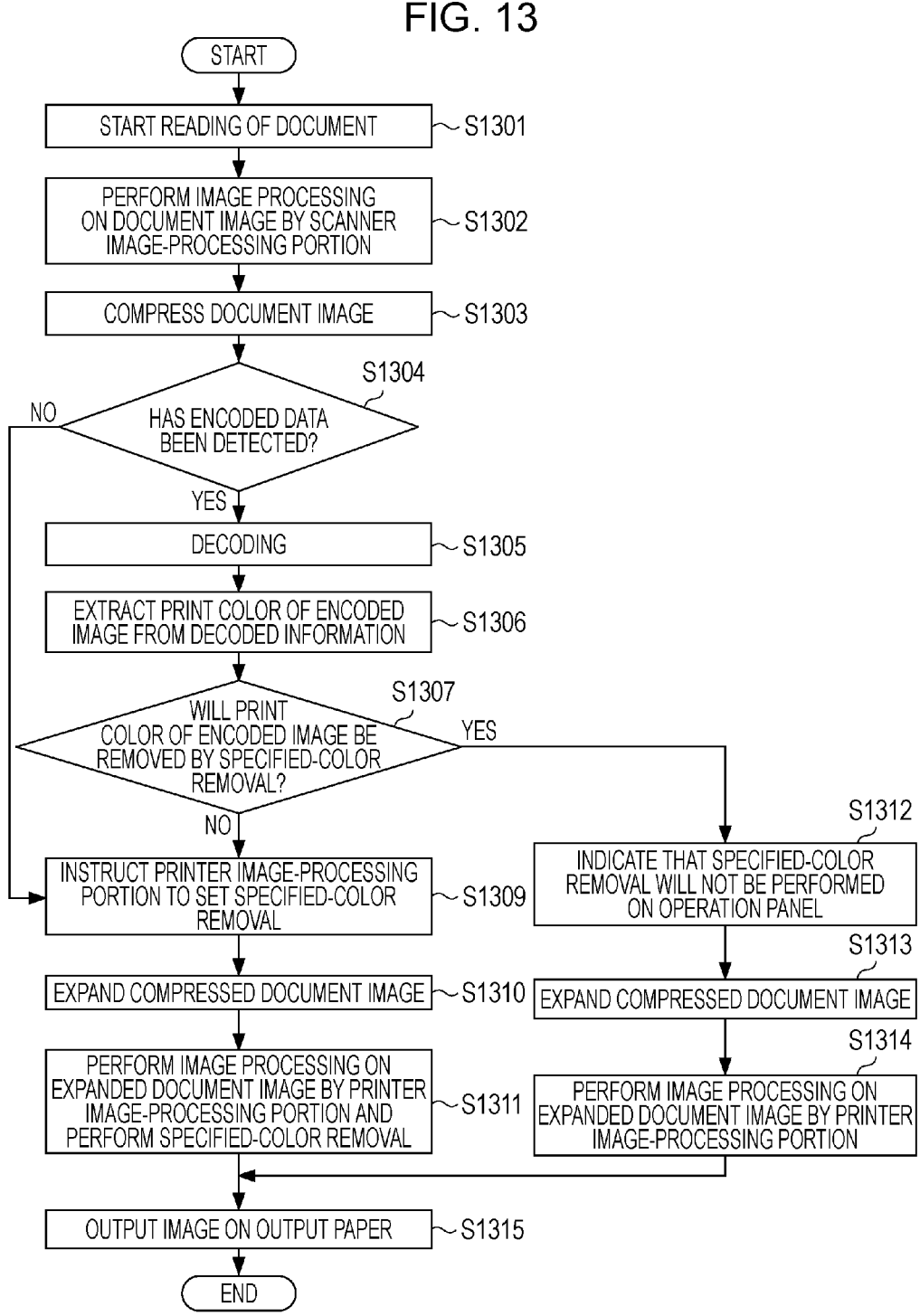
FIG. 13 is a flowchart illustrating a control process in copying when specified-color removal is set.

Compared with the first embodiment, a control process occurring in this case is different from the control process illustrated in the flowchart of FIG. 13. A copying process occurring when specified-color removal is set will now be described with reference to the flowchart of FIG. 14.

FIG. 14 differs from the flowchart of FIG. 13 in the case where after extracting print color of a copy-forgery-inhibited pattern from decoded information in step S1406, it is determined that the color of the copy-forgery-inhibited-pattern will be deleted by specified-color removal (YES in step S1407 in FIG. 14). In this case, flow proceeds from step S1407 to step S1412, where the CPU 301 indicates that printing will not be performed on the operation panel. Then, the CPU 301 provides control for completing the copying process. In such a way, an output image is unobtainable.

The present invention is also applicable to a system composed of a plurality of devices or an apparatus (e.g., multifunction peripheral, printer, facsimile machine) composed of a single device.

The functions according to at least one of the above-described embodiments of the present invention can also be carried out by reading of program code from a storage medium that stores the program and executing of the program by a system or the like. The system or the like includes a CPU or microprocessor unit (MPU) of the system or apparatus. In this case, the functions according to at least one of the above-described embodiments of the present invention can be carried out by the program code itself read from the storage medium.

Examples of the storage medium for supplying the program code include a floppy disk, a hard disk, an optical disk, a magneto-optical disk, a compact-disk read-only memory (CD-ROM), a CD-R, magnetic tape, non-volatile memory card, and a ROM.

The functions of at least one of the above-described embodiments can be carried out not only by a computer executing read program code. In some cases, an operating system running on a computer may perform actual processing in part or in entirety in accordance with instructions of the program code. The functions of at least one of the above-described embodiments may also be carried out by the processing.

Program code read from a computer-readable storage medium can be written in a memory included in a function expansion board inserted in a computer or a function expansion unit connected to the computer, and a CPU included in the function expansion board or function expansion unit can perform actual processing in part or in entity. The functions of at least one of the above-described embodiments may also be carried out by the processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-280438 filed Oct. 29, 2007, which is hereby incorporated by reference herein in its entirety.

What is claimed is:

1. A color removing apparatus for removing a user-specified color, the color removing apparatus comprising:
   a detection unit configured to detect an encoded image in a document image;
   a decoding unit configured to decode the encoded image;
   an identifying unit configured to identify a color of the encoded image based upon information obtained by the decoding unit; and
   a determination unit configured to compare the user-specified color with the color identified by the identifying unit, and to determine whether to remove the user-specified color from the document image based on a result of the comparison.

2. A computer-implemented method for controlling a color removing apparatus to remove a color specified by a user, the method comprising:
   detecting an encoded image in a document image;
   decoding the encoded image;
   identifying a color of the encoded image from information obtained by decoding the encoded image;
   comparing the specified color with the identified color; and
   determining whether to remove the specified color from the document image based on a result of comparing the specified color with the identified color.

* * * * *